(12) United States Patent
Ohme et al.

(10) Patent No.: US 10,430,515 B1
(45) Date of Patent: Oct. 1, 2019

(54) ELECTRONIC DOCUMENT SIGNATURES AND SIGNATURE RETRIEVAL INVOLVING MOBILE COMMUNICATION DEVICE

(75) Inventors: Phillip J. Ohme, San Diego, CA (US); Brett Hellman, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 13/185,412

(22) Filed: Jul. 18, 2011

(51) Int. Cl.
*G06F 17/27* (2006.01)

(52) U.S. Cl.
CPC .................................. *G06F 17/273* (2013.01)

(58) Field of Classification Search
CPC .................................................... G06Q 40/123
USPC ........................................................ 715/205
See application file for complete search history.

(56) References Cited

U.S. PATENT DOCUMENTS

| | | | |
|---|---|---|---|
| 7,634,651 B1 * | 12/2009 | Gerde et al. | 713/153 |
| 8,301,520 B1 * | 10/2012 | Shaw et al. | 705/31 |
| 8,588,483 B2 * | 11/2013 | Hicks et al. | 382/119 |
| 2004/0003390 A1 * | 1/2004 | Canter | G06F 8/61 717/178 |
| 2004/0158607 A1 * | 8/2004 | Coppinger | G06Q 10/107 709/206 |

OTHER PUBLICATIONS

DocuSign Desktop Client User Manual, 2010, pp. 1-87.*
Carpenter, "DocuSign Review," 2010 available at: http://www.productivity501.com/docusign-review/7220/.*
Inman, "DocuSign beefs up mobile capabilities," 2010, available at: http://www.inman.com/2010/06/29/docusign-beefs-mobile-capabilities/.*
http://tenonedesign.com/autograph_help.php?topic=.
http://tenonedesign.com/autographmobile_help.php.
https://itunes.apple.com/us/app/autograph/id339423436?mt=8.
http://tenonedesign.com/autograph.php.
http://web.archive.org/web/20110914171557/http://en.wikipedia.org/wiki/Mobile_device, printed Apr. 28, 2014 (5 pages).
http://web.archive.org/web/20110506103545/http://en.wikipedia.org/wiki/Mobile_device, printed Apr. 28, 2014 (5 pages).
https://www.docusign.com/electronic-signature, printed Apr. 28, 2014 (4 pages).
https://www.docusign.com/support/question/how-do-i-sign-docusign-document-basic-signing, printed Apr. 28, 2014 (6 pages).

* cited by examiner

*Primary Examiner* — Shawn S Joseph
(74) *Attorney, Agent, or Firm* — DLA Piper LLP US

(57) ABSTRACT

Retrieving and sending electronic signatures. A document requiring a signature is sent in an electronic message such as an electronic mail or text message from a computing device of a sender to a mobile communication device of the signor. The signor selects or clicks on a hyperlink within the message to launch a browser on the mobile communication device and download an application to the mobile communication device. The application executes to allow the signor to touch a screen of the mobile communication device and generate a signature that is incorporated into the document and transmitted back to the sender. In certain embodiments, an electronic tax return is sent from a sender computer to a client mobile communication device, the signor generates a touch screen signature, and the signed tax return is transmitted to the sender for filing with a tax authority.

9 Claims, 19 Drawing Sheets

124

Status Table for Signor

| Document | Signature Required? | Signature Requested? | Signature Received? |
|---|---|---|---|
| Doc 1 (ID 8453) | Y | Y | Y |
| Doc 2 (ID 7421) | Y | Y | Y |
| Doc 3 (ID 5173) | Y | N | N |

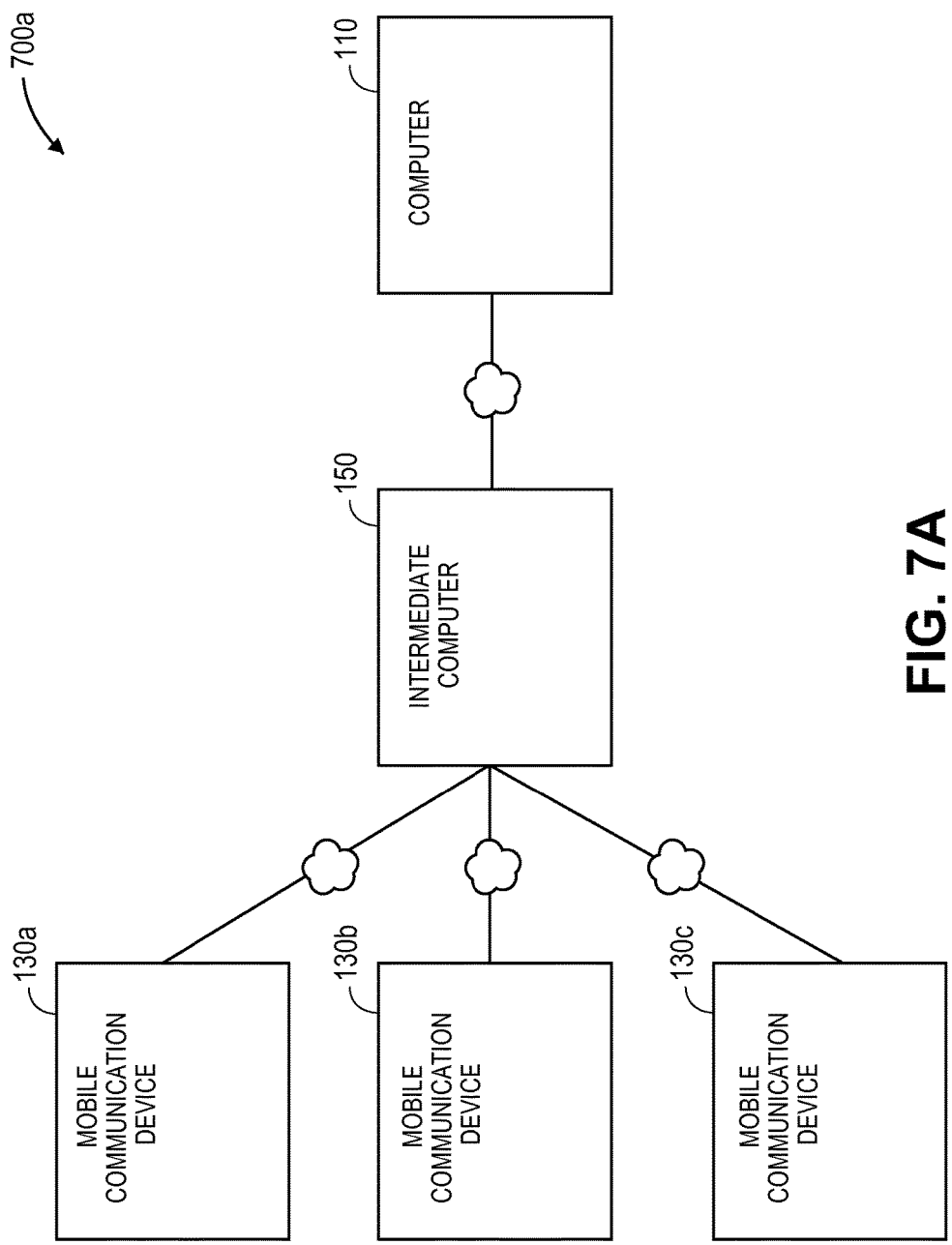

124

Status Table for Signors

| Signor (902a) | Document (902b) | Signature Required? (902c) | Signature Requested? (902d) | Signature Received? (902e) |
|---|---|---|---|---|
| Signor A | Doc 1 | Y | Y | Y |
| Signor A | Doc 2 | Y | Y | N |
| Signor A | Doc 3 | N | | |
| Signor B | Doc 1 | Y | Y | N |
| Signor B | Doc 2 | Y | Y | N |
| Signor B | Doc 3 | N | | |
| Signor C | Doc 1 | Y | Y | Y |
| Signor C | Doc 2 | Y | Y | Y |
| Signor C | Doc 3 | N | | |

FIG. 9

ELECTRONIC DOCUMENT SIGNATURES AND SIGNATURE RETRIEVAL INVOLVING MOBILE COMMUNICATION DEVICE

BACKGROUND

Embodiments relate to electronic document signatures. Various documents including legal, tax and financial documents must be signed for various reasons. Traditionally, a document is printed, manually signed, and then mailed, faxed, scanned, filed and/or stored as necessary. Thus, the document was initially in a digital format, a physical copy was generated for the signature, and then it was converted back to a digital format. This process can be inconvenient, time-consuming and wasteful.

It is not uncommon for the person required to sign a document to be at a different location than the person who prepared the document or the document location. Thus, in order to sign the physical document, the signor may be required to travel to the location of the document to sign a physical copy of the document or exchange various facsimiles. This also involves wasteful travel time and costs, printing and signing of documents and various facsimiles or other communication exchanges.

For example, in the context of electronic tax returns, a tax return prepared by a tax professional, accountant or an individual must be signed by the client or individual before it can be filed with a tax authority. In order to obtain a signature, an accountant may request the client or taxpayer to sign tax return documents when the client is available and before the tax return has been completed. However, signing a tax return before the tax return has been completed is not permitted by tax authorities, and it may be necessary for the client to travel to the accountant's office, require the accountant to travel to the client, or print fax documents back and forth between the accountant and the client.

Thus, in addition to being inconvenient, time consuming and wasteful, known systems and methods for requesting, writing and sending document signatures are not efficient since delays in signing can be caused for various reasons including the schedule of the signor, the signor being at a different location than the accountant or document, and not having access to a fax machine.

These shortcomings also present issues for the accountant or other person who prepared the electronic tax return or other document since the accountant may have many other clients from whom signatures must be obtained. The accountant may have to coordinate with hundreds of clients simultaneously, particularly during tax season when many clients are required to prepare and file electronic tax returns. This can be very confusing to the accountant who may not remember which clients need to sign which documents.

In an attempt to address some of these shortcomings, applications such as Autograph have been developed to allow a user to enter a signature using a smartphone and insert a signature or note into an open document. Such applications, however, have limited functionality, do not involve a sequence of communications involving a preparer of a document such as an accountant or tax professional requesting an actual signature from a client or signor, and given the manner in which they operate, do not provide for tracking status of which signatures have been requested, which signed documents have been received, and which signed documents have been the subject of subsequent action as necessary (e.g., filing a tax return). Autograph also has limitations or restrictions due to requiring a Wi-Fi network. For example, a description of Autograph provided on the APPSTORE from Apple, Inc. explains "Just sign your name, and it will appear on the screen of a nearby computer. Wi-Fi network is required!"

SUMMARY

One embodiment is directed to a computer-implemented method for acquiring a signature of an electronic document. The method comprises sending, through a network, a first electronic message such as an electronic mail or text message from a computer of a sender that is utilized to prepare the document, to a mobile communication device of a signor or client of the sender for whom the document was prepared. The first electronic message includes a hyperlink and an attachment of the document or text of the document to be signed within the body of the electronic message. The hyperlink is a reference to an application such that when the hyperlink is selected or clicked by the signor using the interface or controls of the mobile communication device, the signor is directed to the application to download the application to the mobile communication device. A browser is executed on the mobile communication device to download and launch the application, which allows the signor to contact or touch a screen of the mobile communication device to write an actual signature that is incorporated into the document. The method further comprises receiving a second electronic message or response from the mobile communication device through at the sender computer. The received electronic message includes the document incorporating the signature.

A further embodiment is directed to a method for acquiring signatures of documents from different signors. Electronic messages, such as electronic mail or text messages, are sent from a computer of a sender who prepared respective documents for respective signors to respective mobile communication devices of respective signors. A first electronic message includes an attachment or text of a first document to be signed by the first signor and a hyperlink. The hyperlink is selected or clicked by the first signor to download an application to the first mobile communication device. The application is executed to allow the first signor to contact or touch a screen of the first mobile communication device to write a first signature that is incorporated into the first document, which is then sent from the first mobile communication and received at the sender computer. The sender computer also sends another electronic message with a second document and the hyperlink to a second mobile communication device of a second signor for whom the second document was prepared. The second signor selects or clicks on the hyperlink to download the application to the second mobile communication device, and the application is executed to allow the second signor to contact or touch a screen of the second mobile communication device to write a second signature that is incorporated into the second document. The second signed document is then sent from the second mobile communication device and received at the sender computer.

Yet another embodiment is directed to a method for tracking document signature status, e.g., which signatures have been requested, and which ones have been requested and received from the various signors. In this embodiment, a sender of documents for various signors sends respective electronic messages, such as electronic mail or text messages, from the sender's computer to respective mobile communication devices of respective signors for whom respective documents were prepared. Each electronic message includes an attachment or text of at least one document to be signed by a signor and a hyperlink. The hyperlink can be selected or clicked by the signors to download an application to their respective mobile communication devices. The application is executed to allow the signors to contact their respective device screens and write their respective signatures, which are incorporated into their respective documents. When the document signature requests are sent from the sender computer, the sender computer generates or updates a data structure such as a table to indicate which documents require a signature and document signatures which were requested from respective signors. Embodiments may involve one signor and one document, one signor and multiple documents, or multiple signors, which may be requested to sign one or multiple documents.

Another embodiment is directed to a method for electronically signing a document and comprises receiving an electronic message such as an electronic mail or text message from a computer of a sender of the document and at a mobile communication device of a signor for whom the document was prepared. The electronic message includes an attachment or text of the document to be signed and a hyperlink. The hyperlink is selected or clicked to launch a browser on the mobile communication device and download an application to the mobile communication device. The application executes to display a signature field on a screen of the mobile communication device, and a signature is written by the signor contacting or touching the display screen. The signature is incorporated into the document, which is transmitted back to the sender in another electronic message.

Other embodiments are directed to articles of manufacture, computer program products or non-transitory computer readable medium, including native or downloadable applications, which can be downloaded to or execute on mobile communication device, and comprise a sequence of instructions which, when executed, are operable to perform methods for requesting signatures, tracking signature status, and/or for signing documents utilizing a mobile communication device. Such embodiments involve selecting or clicking a hyperlink to download and launch an application to sign a document and return the signed document to the sender in an electronic message.

Further embodiments are directed to systems configured or operable to acquire signatures, track signature status and/or to sign documents utilizing a mobile communication device. System embodiments may include one or more or all of the following system components: computer of sender who may have prepared documents for the signor and require the signor's signature, a mobile communication device of the signor, an application that executes on the mobile communication device and/or sender computer, and a computer or server from which the application is downloaded. The computer or server may also host a signature status program that tracks signature requests and stores signed documents that may be accessed by or sent to document senders.

In a single or multiple embodiments, the sender also prepares an electronic tax return for the signor such as a client or taxpayer, and when the electronic tax return has been completed and signed, it can be filed on behalf of the signor by the sender with an electronic filing server, which formats and processes the electronic tax return as necessary and transmits the electronic tax return to a computer of a tax authority. The sender may receive signed documents from one signor or multiple signors, and file one electronic tax return or multiple electronic tax returns.

In a single or multiple embodiments, the computer utilized to prepare the document and the mobile communication device are at the same or different, remote locations. For example, the signor may be at an office of the sender, and instead of the sender printing the document, the signor manually signing the document, and the sender scanning or making a copy of the signed document, the sender sends an e-mail to the signor who signs the document with the mobile communication device such that it is not necessary to print or manually sign the document. Embodiments also allow for signing and returning of documents from remote locations or when the sender and the signor are not at the same location or are in different offices, buildings, cities, states or countries.

In a single or multiple embodiments, networks utilized for communications to and from the mobile communication device involve Internet communications such as Hypertext Transfer Protocol (HTTP), electronic mail, and File Transfer Protocol (FTP) communications and thus are not restricted to a Wi-Fi network or a particular hotspot and instead involve data communications beyond a Wi-Fi network firewall such that users are not tied or restricted to a particular or Wi-Fi network or computer.

In a single or multiple embodiments, after electronic messages such as electronic mail or text messages are sent to a mobile communication device, the signature status is tracked, and the sender computer generates or updates a data structure such as a table or database that shows which signors have been sent their documents for signature, and which documents have been signed and returned to the sender. Signature status updates may involve one document for one signor, multiple documents for a single signor, multiple signors and a single document to be signed for each signor, or multiple and possibly different documents for each signor. Reminders, e.g., in the form of an electronic mail, text or other electronic message, can be sent to signors who did not respond to the sender's earlier e-mail regarding signing documents or have not yet signed and returned the document within a certain time.

In a single or multiple embodiments, electronic mail communications between the sender computer and signor's mobile communication device can be direct communications through a network, and the application can be downloaded to the mobile communication device from a separate computer or server. In another embodiment, electronic communications between the sender computer and signor's mobile communication device are sent through intermediate computer that hosts the application and/or data structure that stores the status of signature requests. Thus, embodiments may involve a cloud computing resource or Software As A Service (SaaS) system platform. Further, in a single or multiple embodiments, signed documents or signatures sent by a signor can be sent to the intermediate server and stored there until they are fetched by the sender computer.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIG. 4 illustrates an example of a signature status table generated or updated according to embodiments to indicate whether a document signature was requested and/or received by the sender;

FIG. 7A is a block diagram of one embodiment of a system configured for requesting and/or transmitting document signatures from multiple signors in which an application for entering a signature is downloaded from a server that is in communication with mobile communication devices of respective signors and a computer of the sender;

FIG. 9 illustrates an example of a signature status table generated or updated according to embodiments to indicate whether document signatures for various signors were requested and/or received by the sender;

DETAILED DESCRIPTION OF ILLUSTRATED EMBODIMENTS

Embodiments are directed to systems, methods and computer program products such as smartphone applications that eliminate the need to need to print, manually sign, and scan, fax or mail signature pages or signed documents. A mobile communication device is utilized by a signor to receive an electronic message such as a text message, electronic mail or other electronic communication from a sender of a document, electronically sign the document using an application that allows the signor to enter the signature by touching a display of a mobile communication device to create the signature, and transmit the document incorporating the signature back to the sender. The sender, who may be an accountant or tax professional, as an example, can send various documents requiring signatures to various signors and track to whom documents were sent, which documents were signed and received at the sender computer.

In this manner, communications between different people and different communication devices regarding documents requiring signatures, and signing of those documents, can be completed at the same or different, remote locations, and at various times, without having to go from a digital format to a printed document, and back to a digital format (e.g., from an electronic document, to a printed version that is signed, back to a scanned, copied or faxed version). Embodiments also eliminate the need for signors to travel to a sender such as an accountant or other person who prepared the documents for signature and facilitates services performed by the sender since signature can be made using a mobile communication device from anywhere at any time. Further, embodiments still allow the sender and/or signor to print and sign a physical document rather than, or in addition to, electronic signatures since the signor receives the document as an attachment or as text within the body of the electronic message and can sign the document using a traditional written signature or an electronic signature entered into the mobile communication device. Embodiments and aspects thereof are in further detail with reference to FIGS. 1A-13.

Figure 1A:
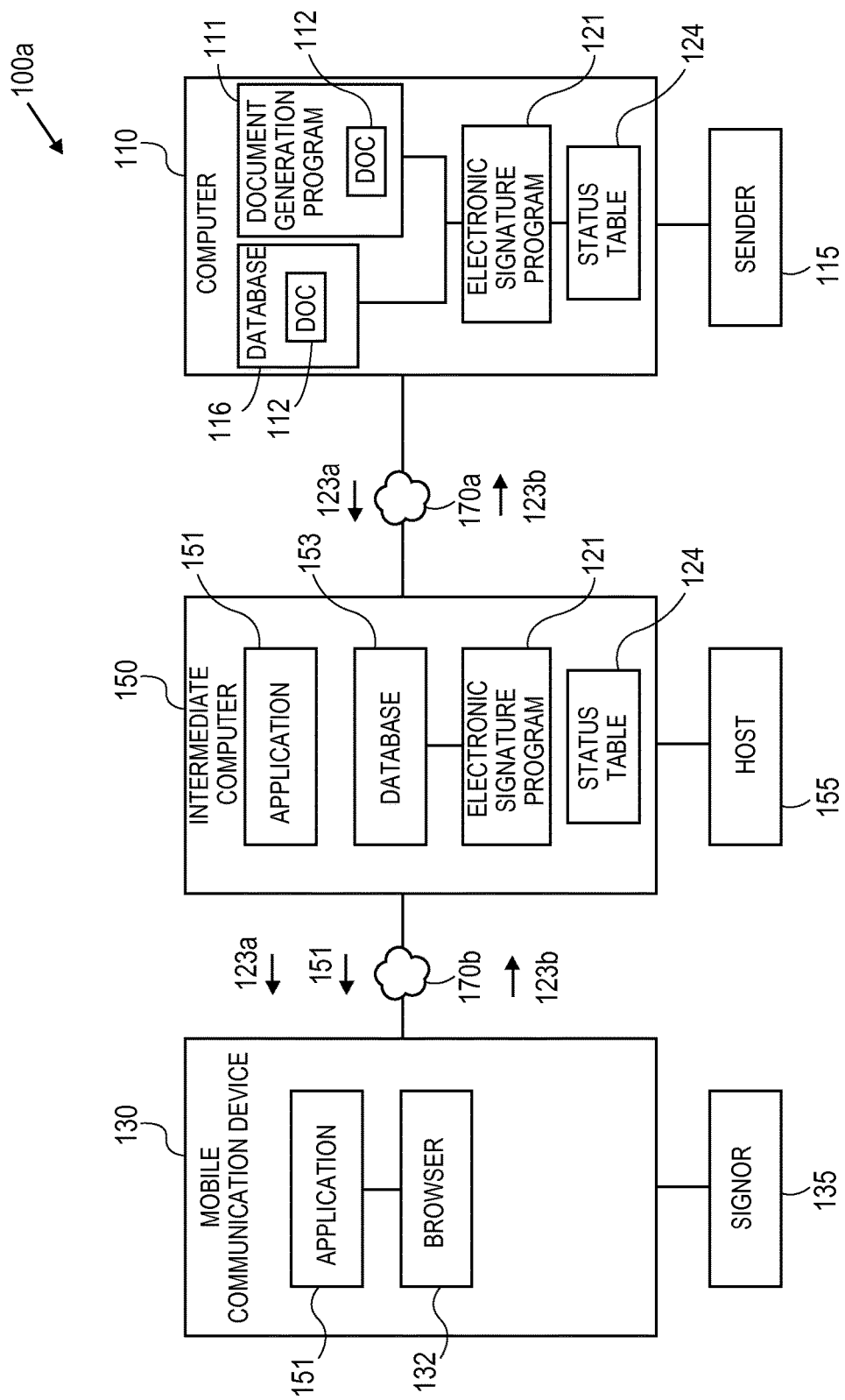
FIG. 1A is a block diagram of one embodiment of a system configured for requesting and/or transmitting document signatures in which an application utilized by a signor to enter a written signature is downloaded from an intermediate server in communication with a sender computer and a signor's mobile communication device.
Figure 1B:
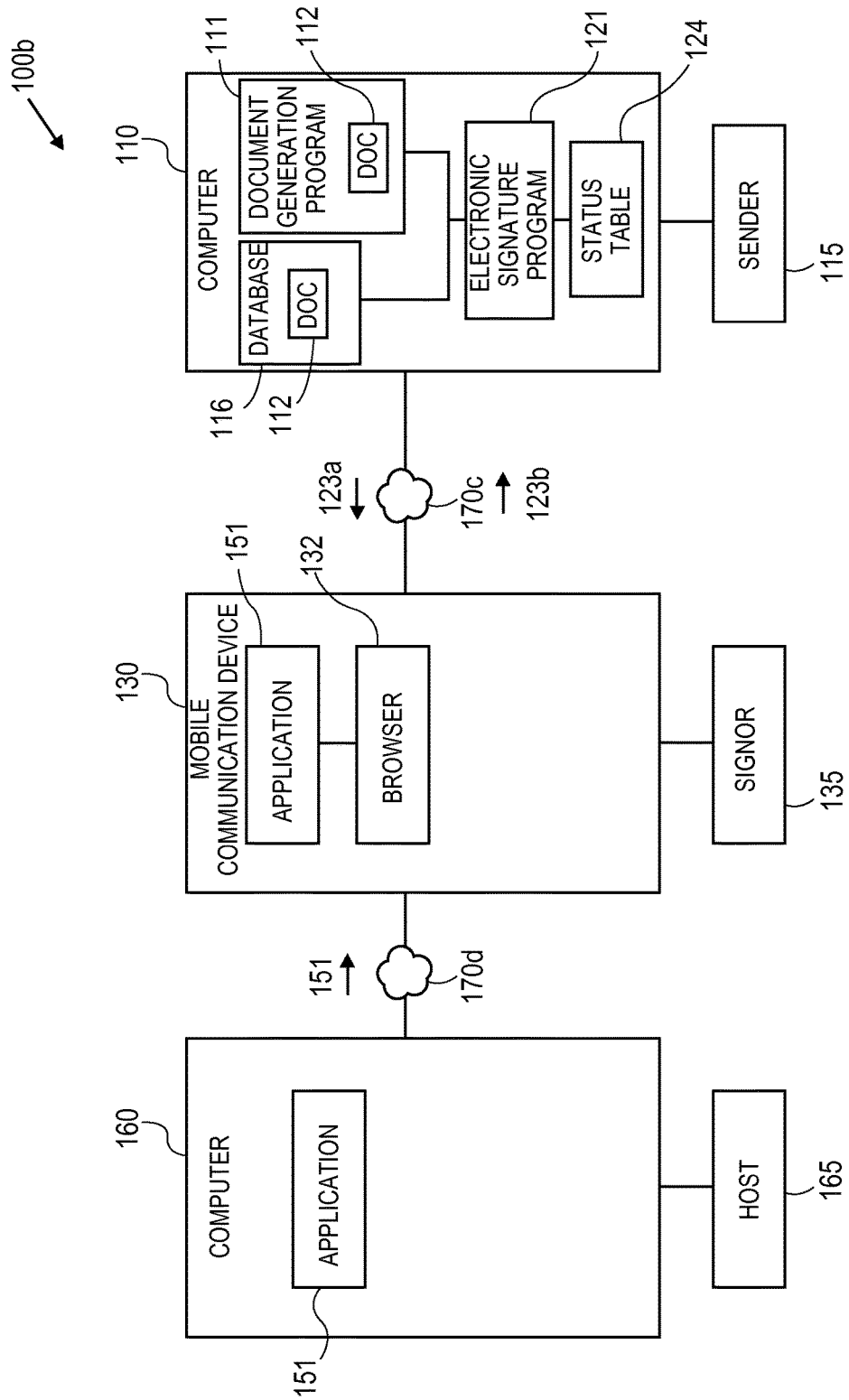
FIG. 1B is a block diagram of on embodiment of a system configured for requesting and/or transmitting document signatures in which an application utilized by a signor to enter a written signature is downloaded from a server in communication with a signor's mobile communication device.
Figure 2:
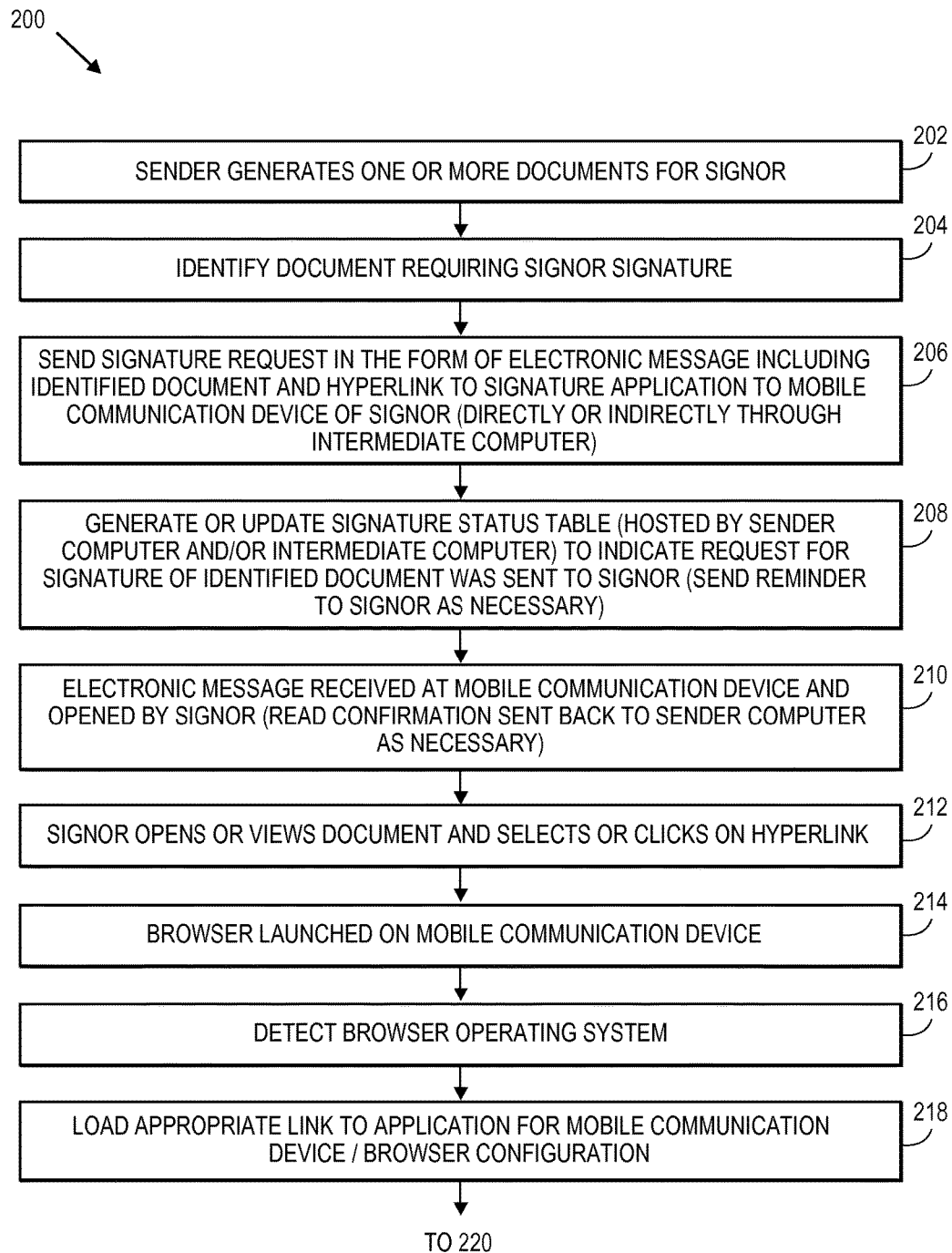
FIG. 2 is a flow diagram of one embodiment of a method for requesting and/or transmitting document signatures and updating a signature status table maintained by a sender of a document.
Figure 2:
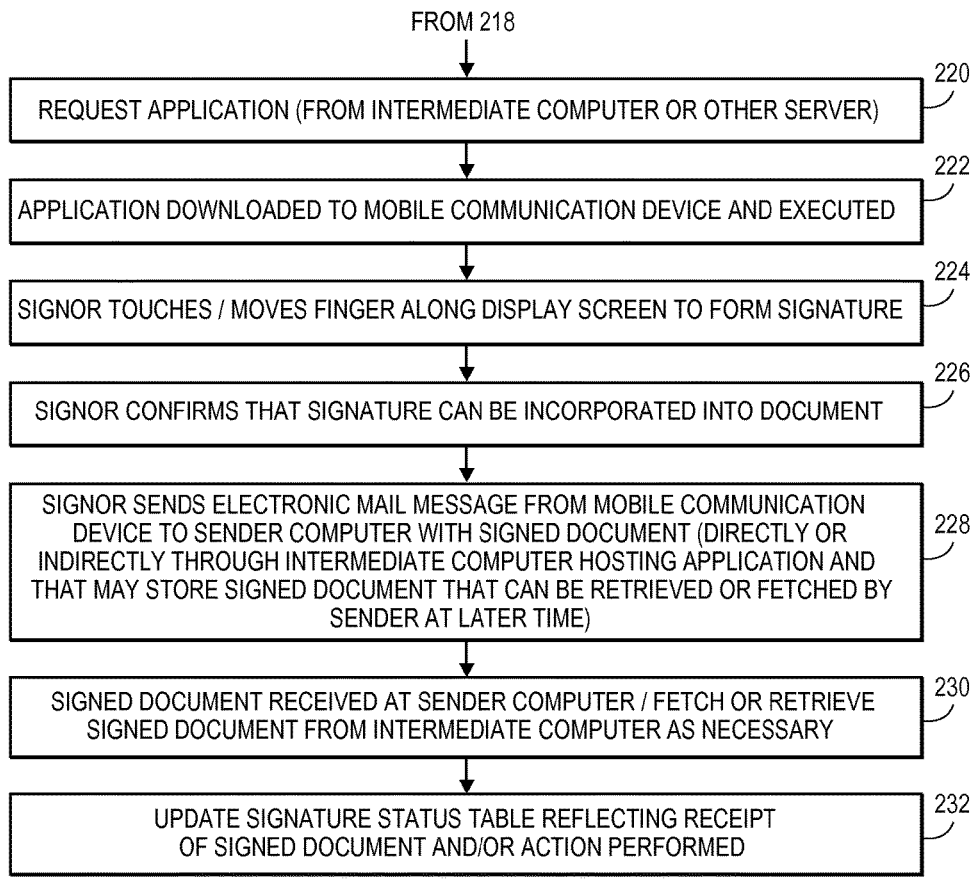

Referring to FIGS. 1A-B and FIG. 2, systems 100a and 100b and a method 200 for requesting, transmitting receiving and/or fetching a signature page or executed document comprises, at step 202, a preparer or sender 115 (generally, "sender" 115 as shown in FIGS. 1A-B) generates a document 112 ("doc" 112 in FIG. 1) to be signed by a signor or client 135 (generally, "signor" 135 as shown in FIGS. 1A-B). For this purpose, as shown in FIGS. 1A-B, the sender 115 utilizes document generation program 111 executing on a sender computer 110 to generate the document 112. The document 112 may be stored in a data store or database 116. While certain embodiments are described with reference to a sender 115 generating a document 112 to be signed, the document 112 may already be generated or may be a form that is to be forwarded or sent by the sender 115 to a signor 135 for signature.

The sender 115 may prepare, forward or send various types of documents 112 using various types of document generation programs 111 and that are to be signed by various signors 135. For example, the sender 115 may be an accountant, an attorney, a doctor or an insurance agent, and the document 112 prepared using the document generation program 111 and to be signed may be, for example, a financial document such as a corporate or accounting document or tax return that is to be signed by an officer of a company (in the case of a corporate or business-related document) or an individual signature on a personal tax return or Form 1040 or other tax form, a legal document such as a declaration or will, a medical document such as a release of a patient or release of medical records, or an insurance policy or claim form.

For example, the document 112 may be an electronic tax return generated by a sender 115 who is an accountant or tax professional using a document generation program 111 in the form of a tax preparation application. The electronic tax return must be signed by the signor 135 before being filed with a tax authority. Embodiments may also be utilized for signature of other documents 112 such as letters, memorandum, spreadsheets and financial statements prepared using a document generation program 111 in the form of a word processing program or a spreadsheet program. Thus, it will be understood that various document generation programs 111 may be utilized to generate various documents 112, and that such documents 112 may be generated or transmitted by various senders 115 for various signors 135 including individuals and corporate entities. For ease of explanation, reference is made generally to a document 112, a sender 115 (who may generate, forward and/or send the document 112), and a signor 135 who is to sign the document 112 and return the signed document 112 to the sender 115.

With continuing reference to FIGS. 1A-B and 2, at step 204, the sender 115 or the document generation program 111 identifies one or more documents 112 to be signed by the signor 135. At step 206, the sender 115 executes an electronic signature program 121, which may be a module or part of the document generation program 111 or a separate program as shown in FIGS. 1A-B. The electronic signature program 121 may be utilized with or independently of the document generation program 111 to send a request in the form of an electronic message 123a (generally, "electronic message" 123a) to the signor 135 to sign the identified document 112. For ease of illustration and explanation, reference is made to the electronic signature program 121 as a separate program executing on the sender computer 110.

Figure 3:
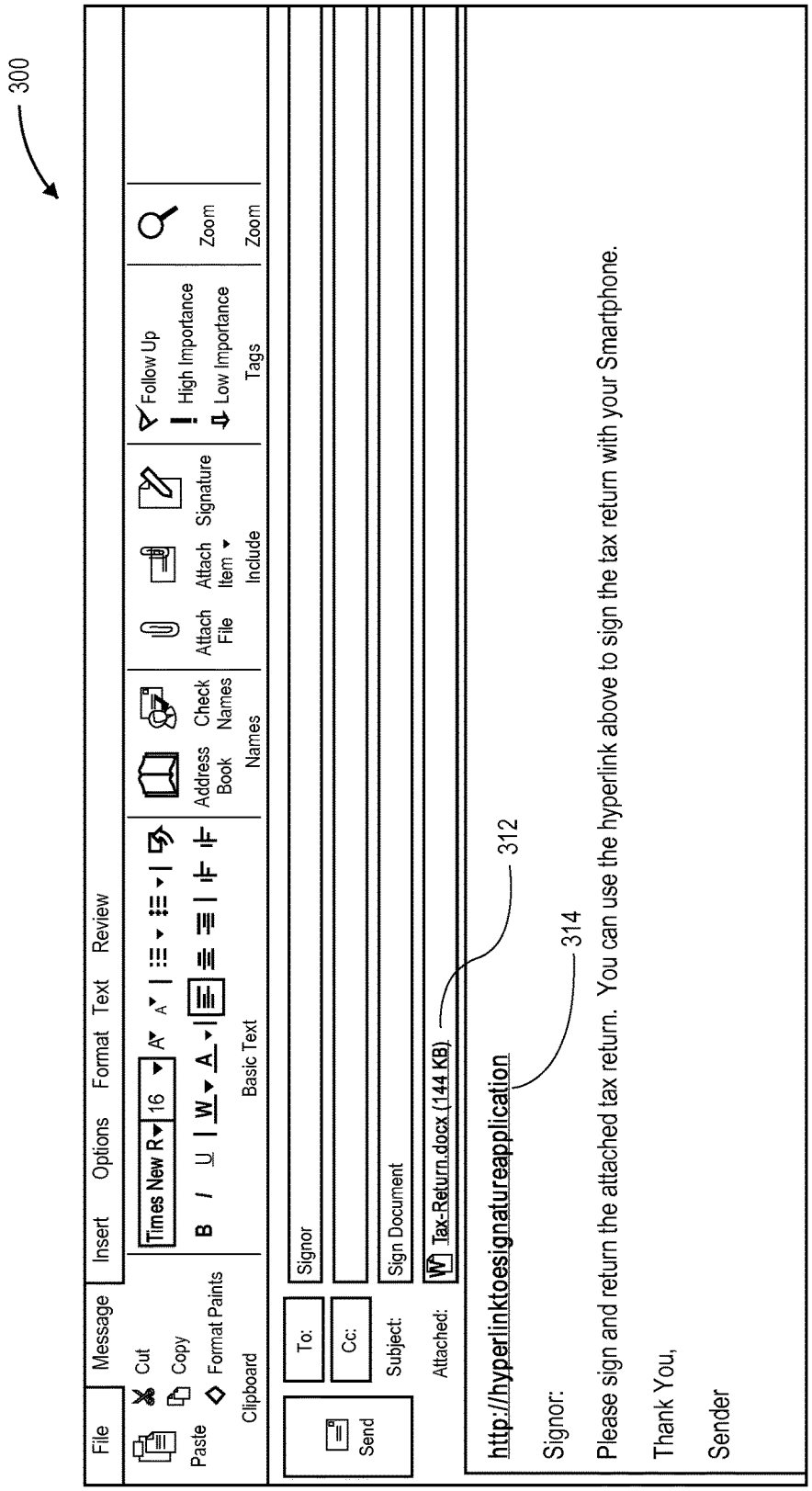
FIG. 3 illustrates an embodiment in which an electronic message sent by a sender to a signor and requesting signature by the signor is in the form an electronic mail message including a the document and a hyperlink to an application to be downloaded by the signor to the signor's mobile communication device to sign the document.

Referring to FIG. 3, and with continuing reference to FIGS. 1A-B, according to one embodiment, the electronic signature program 121 is programmed or operable to generate the electronic message 123a in the form of an electronic mail message 300. The electronic mail message 300 includes an attachment 312 of the document 112 to be signed together with a hyperlink or link 314 to an electronic signature application 151 (generally, "application" 151 as shown in FIGS. 1A-B). The signor 135 is directed to the application 151 by selecting or clicking on the hyperlink 314 to download the application 151 to the mobile communication device 130. The hyperlink 314 is not an application but instead a reference, word, phrase, or image that the signor 135 can select or click on to be directed or jump to a new Web page or resource including the application 151 so that the application 151 can then be downloaded to the mobile communication device 130 and executed. The body of the electronic mail message 300 may also include text (not shown in FIG. 3) of the identified document 112, and the electronic mail message 300 may include both the attachment 312 and the text of the document 112.

While certain embodiments are described with reference to an electronic message or request 123a in the form of an electronic mail message 300 as shown in FIG. 3, it should be understood that other types of electronic messages 123a may be utilized in embodiments including, but not limited to, a text message sent using, for example, Short Messaging Service (SMS). For ease of explanation, embodiments are described with reference to an electronic message 123a, or an electronic mail message 300 as a particular example of how embodiments may be implemented.

The mobile communication device 130 of the signor (e.g., as shown in FIGS. 1A-B) may be a cellular telephone, a smartphone, a tablet, or other mobile computing device including a touchscreen and capable of electronic communications with the sender computer 110, intermediate computer 150 and/or a computer 160 hosting the application 151. For ease of explanation, reference is made to a mobile communication device 130 or smartphone. Further, while certain embodiments are described with reference to a computer 110 of the sender 115 and a mobile communication device 130 of the signor 135, the document 112 may also be generated with a mobile communication device of the sender 115. Thus, the sender computer 110 may be a mobile communication device such as a cellular telephone, smartphone, tablet device or other mobile communication device including a touch screen. The sender computer may also be a computer such as a desktop computer, laptop computer, or netbook computer. For ease of explanation, reference is made to a sender's computer 110 and a signor's mobile communication device 130.

Referring again to FIG. 1A, according to one embodiment, the electronic message 123a is sent from the sender computer 110 to the mobile communication device 130 through an intermediate computer or server 150 via networks 170a, 170b. In the illustrated embodiment, the intermediate computer 150 hosts the application 151 to be downloaded by the signor 135 and may also host the electronic signature program 121.

Referring to FIG. 1B, in another embodiment, the electronic message 123a is sent directly from the sender computer 110 to the mobile communication device 130 through a network 170c, and the application 151 may be hosted by the computer or server 160 that is in communication with the mobile communication device 130 via network 170d.

Networks 170a-d (generally, "network" 170), may be a Local Area Network (LAN), a Wide Area Network (WAN), Metropolitan Area Network (MAN), a wired or wireless network, other suitable networks capable of transmitting data, or combination thereof such that communications between system components may involve a single or multiple communication methods or protocols. For ease of explanation, reference is made to a network 170 generally, but it should be understood that various numbers and types of networks 170 may be utilized, and that known communication protocols and networks can be utilized for communications between system components.

Referring again to FIG. 2, and with continuing reference to FIGS. 1A-B, at step 208, the electronic signature program 121 generates or updates a data structure 124 such as a signature status database or signature status table (generally, "status table" 124 as shown in FIGS. 1A-B) that indicates the status of the sender's electronic message 123a, e.g., whether the signature request was sent, whether the signature was received from the signor 135, and whether some subsequent action was performed after receipt of the signed document 112 by the sender 115. The status table 124 may be hosted, created, maintained and/or updated by the sender computer 110 and/or intermediate computer 150 depending on which system embodiment is utilized and how the computers 110 and 150 are configured.

For example, referring to FIG. 4, the status table 124 for a particular signor 135 may include columns 402*a*-*d* identifying the document 112, whether the document 112 requires a signature, whether the sender 115 sent an electronic message 123*a* requesting the signor 135 to sign the document 112, and whether the signed document 112 was received by the sender 115. The status table 124 may also include another column for a note or indicator relating to whether a certain action was completed after the signed document 112 was received by the sender 115, e.g., the signed document 112 was sent to another person, filed, recorded or some other action was completed.

Figure 5:
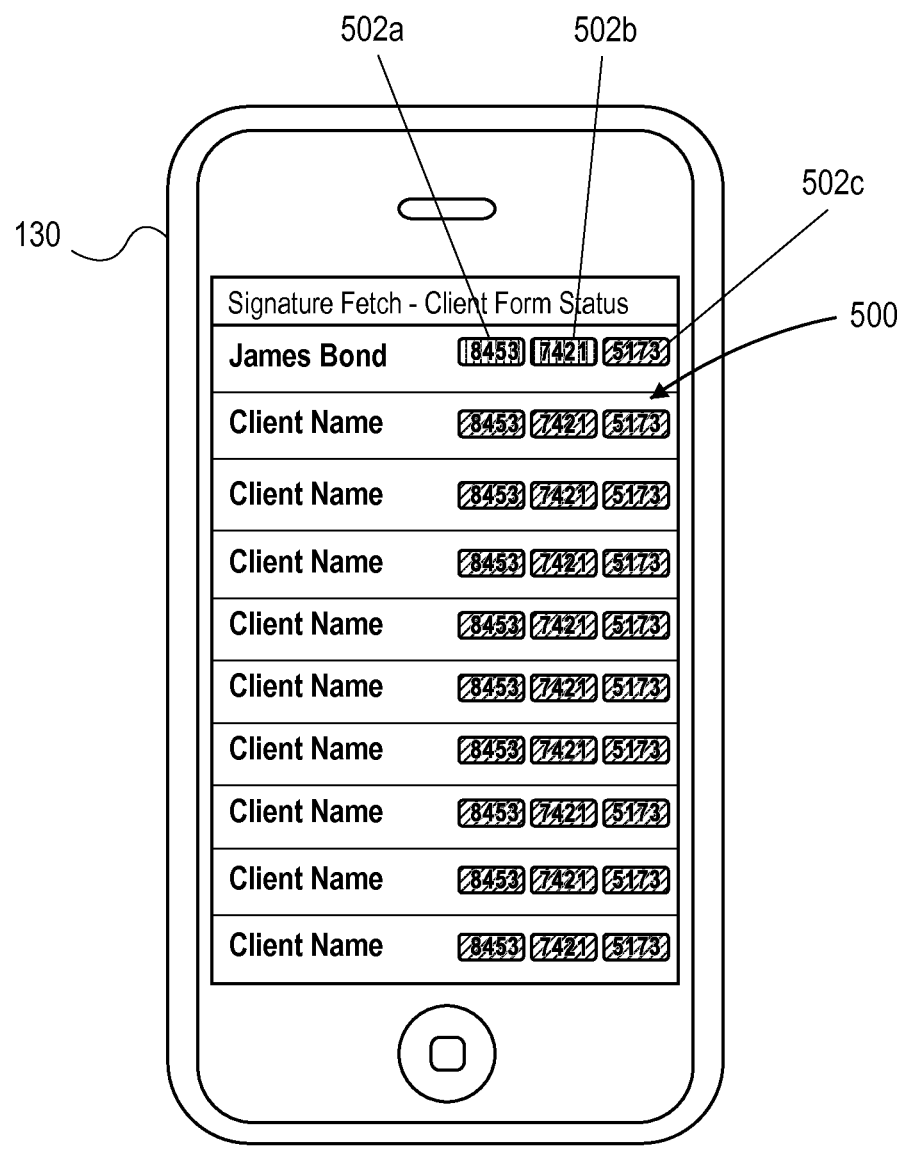
FIG. 5 illustrates an interface generated according to one embodiment based on data of the signature status table shown in FIG. 4, and that may be displayed on a mobile communication device or computer of a sender to indicate which documents have been signed and/or returned to the sender.

Referring to FIG. 5, data of the status table 124 shown in FIG. 4 may be compiled or transformed into an interface 500 that is displayed on a screen of the sender computer 110 (which may be smartphone or other mobile communication device as described above and as shown in FIG. 5). The interface 500 identifies the signor 135 (e.g., James Bond), includes elements 502*a*-*c* representing or identifying three documents 112 that require a signature (e.g., documents identified by 8453, 7421 and 5173 as shown in FIG. 5).

Referring again to FIG. 2, at step 210, the electronic message 123*a*, which may be in the form of the electronic mail message 300 as discussed above is received at the mobile communication device 130 and opened by the signor 135. A read confirmation message may be sent back to the sender computer 110 as necessary so that the sender 115 can confirm that the electronic message 123*a* requesting the signature was received by the signor 135.

At step 212, the signor 135 opens or views the document 112 and selects or clicks on the hyperlink 314 by touch, with a stylus or using an electronic mail interface such that at step 214, a browser 132 (as shown in FIG. 1) executes on the mobile communication device 130. At step 216, the operating system of the browser 132 utilized is detected, and at step 218, an appropriate hyperlink 314 to the application 151 to be downloaded to the mobile communication device 130 is entered into the browser address line per the browser 132 configuration. The same hyperlink 314 received in the electronic mail message 300 or a modified version may be utilized depending on the browser 132 operating system. In this manner, the sender 115 can send electronic messages 123*a* including the same hyperlink 314 to the application 151 to various signors 135 without worrying about the particular mobile communication device 130 or browser 132 utilized by signors 135.

At step 220, as a result of selecting or clicking on the hyperlink 314, a request for the application 151 is transmitted from the mobile communication device 130 to the intermediate computer 150 hosting the application 151 (as shown in FIG. 1A) or another computer or server 160 (as shown in FIG. 1B). At step 222, the application 151 is downloaded from the intermediate computer 150 or other computer 160 to the mobile communication device 130 and executed on the mobile communication device 130.

While embodiments are described with reference to an application 151 that is downloaded to and executes on the mobile communication device 130, embodiments may also be implemented using a web application that can be accessed by the browser 132 and the signor 135 entering an address of the web application on the intermediate computer 150 or other computer 160. For ease of explanation, reference is made to an application 151 that is downloaded to and executes on the mobile communication device 130. Thus, the application 151 and manner in which the application 151 may be accessed and utilized may be in the form of Software as a Service (SaaS) or a cloud computing resource.

Figure 6B:
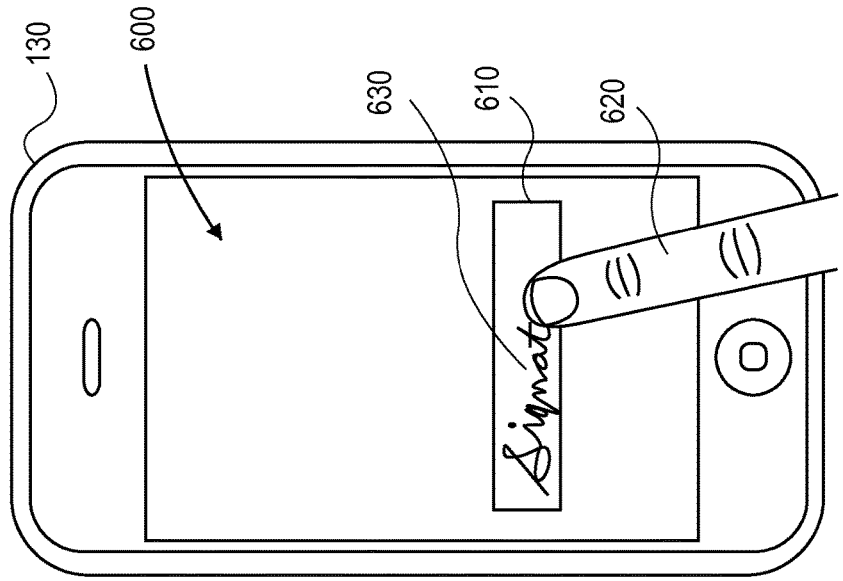
FIGS. 6A-E illustrate how embodiments are executed such that a signor utilizing an application downloaded to a mobile communication device can touch a display screen of the mobile communication device to manually enter an electronic signature to be integrated into an electronic document.
Figure 6A:
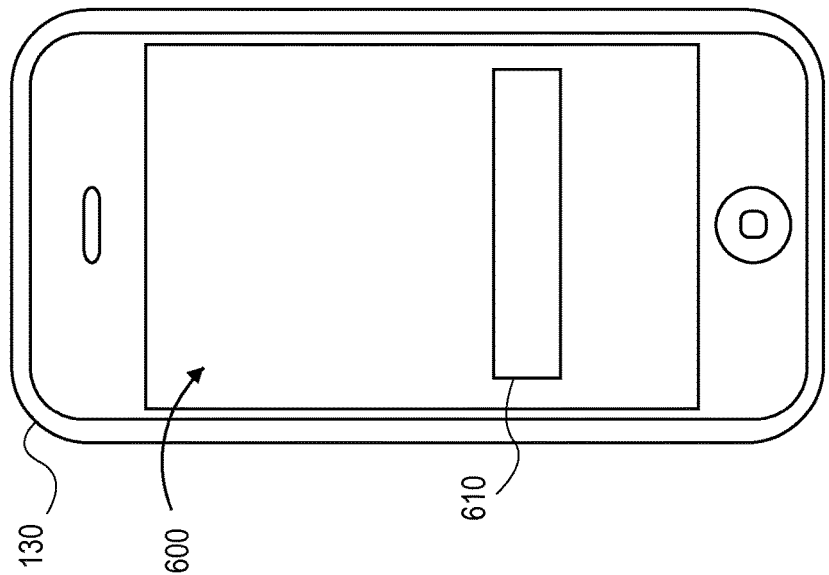
Figure 6E:
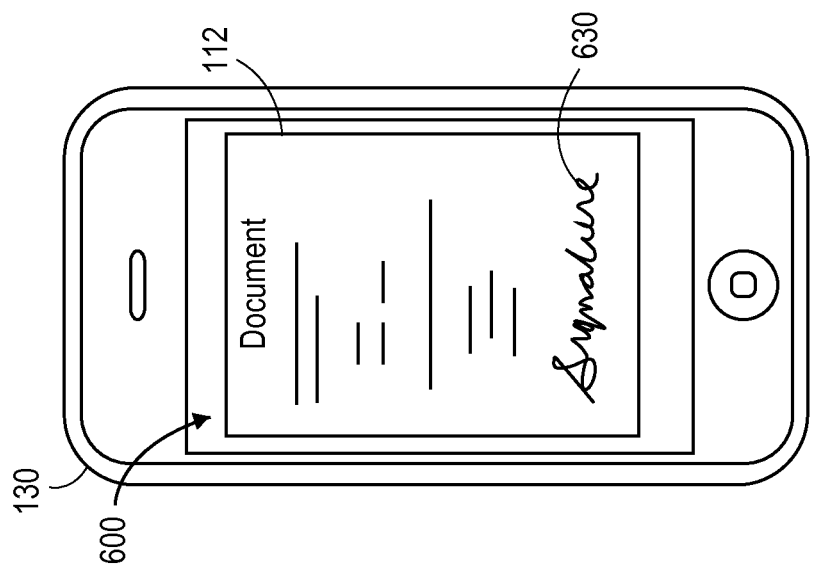
Figure 6D:
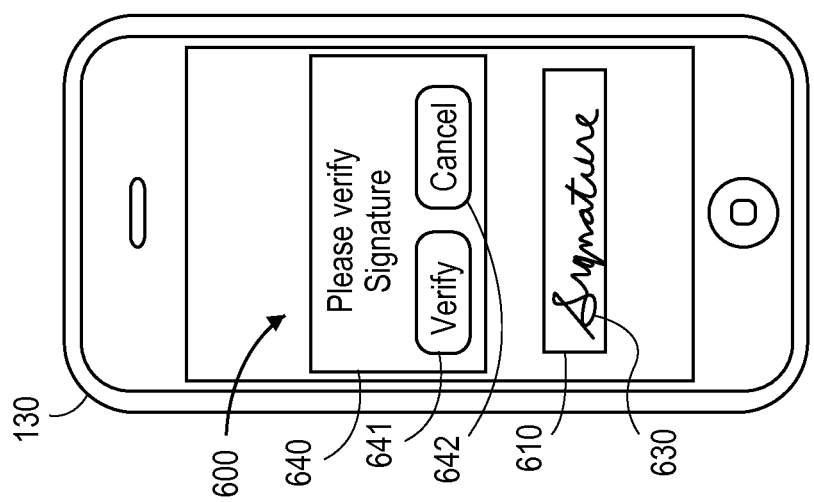
Figure 6C:
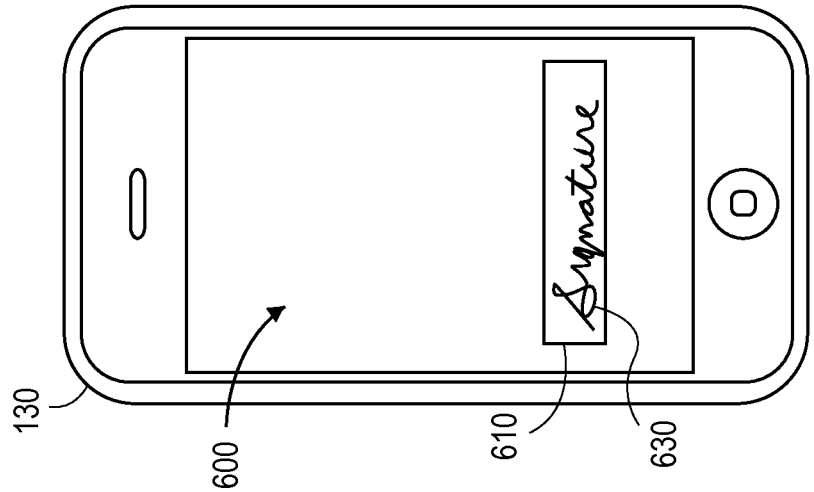

With continuing reference to FIG. 2, and with further reference to FIGS. 6A-E, which illustrates a mobile communication device 130 and interface 600 displayed on a display screen of the mobile communication device 130, the application 151 executes to display a signature field 610 as shown in FIG. 6A. The signature field 610 may be displayed alone, without showing the corresponding document 112 to be signed. In another embodiment, the signature field 610 is displayed by itself (as shown in FIG. 6A), within the document 112 to be signed or presented over the portion of the document 112 to be signed and that is displayed in the background of the signature field 610. At step 224, and as shown in FIG. 6B, the signor 135 touches the display screen of the mobile communication device 130 with a finger, stylus or other device 620 (generally, finger 620), and moves the finger 620 along the display screen to form the signor's signature 630 on the screen as shown in FIG. 6C.

With continuing reference to FIG. 2, and with further reference to FIG. 6D, at step 226, the application 151 requests the signor 135 to confirm whether the signature 630 should be accepted and utilized, e.g., as a pop up message 640 with options 641 and 642 for verifying that the signature 630 can be utilized and rejecting or canceling the signature 630 in which case the signor 135 can clear the current signature 630 and generate another. If the signature 630 is accepted, then at step 228, the signature 630 is incorporated into the document 112 or a signature page thereof as shown in FIG. 6E.

The electronic signature 630 may be in the form of a .jpeg, .bmp, .gif, .png, .tiff or other suitable format for the document 112 to be signed, which may, for example, be a .pdf document, an image or other suitable format. For purposes of incorporating, pasting or embedding the signature 630 into a document 112, the signor 135 may drag the signature 630 and drop it into a desired signature field or location within the document 112. According to another embodiment, the document 112 to be signed has a pointer, indicator or marker identifying where the electronic signature 630 will be embedded into the document 112 by the application 151, or the application 151 may be configured to identify a pre-determined sequence of words (e.g., a valediction or closing of a letter) or underlining where the signature 630 should be placed. It will be understood that the location within the document 112 into which the signature 630 will be inserted can be identified or determined in various ways.

Referring again to FIGS. 1-B and 2, at step 228, the signor 135 sends an electronic message 123*b* in response to the sender's electronic message 123*a*. The electronic message 123*b* may also be in the form of an electronic mail message sent from the mobile communication device 130 to the sender computer 110 and includes the signed document 112 or signature page thereof. The electronic message 123*b* may be sent to the sender computer 110 through the intermediate computer 150 hosting the application 151 (as shown in FIG. 1A) or to the sender computer 110 directly (as shown in FIG. 1B).

With continuing reference to FIGS. 1-B and 2, at step 230, the electronic signature program 121 receives the signed document 112 from the mobile communication device 130 or intermediate computer 150. In another embodiment, the electronic signature program 121 is used to fetch or retrieve the signed document 112 from the intermediate computer 150 if, for example, the signed document 112 sent from the mobile communication device 130 is stored in a database 153 hosted by the intermediate computer 150. In this embodiment, the sender computer 110 is used to retrieve the signed document 112 from the database 153 in response to a sender 115 request or in response to periodic requests for any new signed documents 112.

With continuing reference to FIG. 2, and with further reference to FIG. 4, at step 232, the status table 124, which may be hosted and generated, maintained or updated by one or both of the sender computer 110 and the intermediate server 150 (as in the embodiment illustrated in FIG. 1A) is updated to reflect whether the signed document 112 was received. At step 234, electronic signature program generates the interface 500 (as shown in FIG. 5) based on data of the status table 124 to reflect these changes or updates. For example, referring again to FIG. 5, elements 502 representing documents 112 that have not yet been signed and received can have a lighter background, a first color or first indicator, whereas elements 502 representing documents 112 that have been signed and received can be a darker background, second color or second indicator. In the illustrated example, elements 520*a-b* are a different color compared to element 520*c* to indicate that document numbers 8453 and 7421 have been signed and received by the sender 115, whereas document number 5173 still needs to be signed and sent by signor 135. After a pre-determined time, or in response to a sender 115 request, a reminder or a duplicate of the prior electronic message 123*a* requesting signature of any remaining documents (such as document 5173 in FIG. 5) can be sent to the signor 135.

Figure 7B:
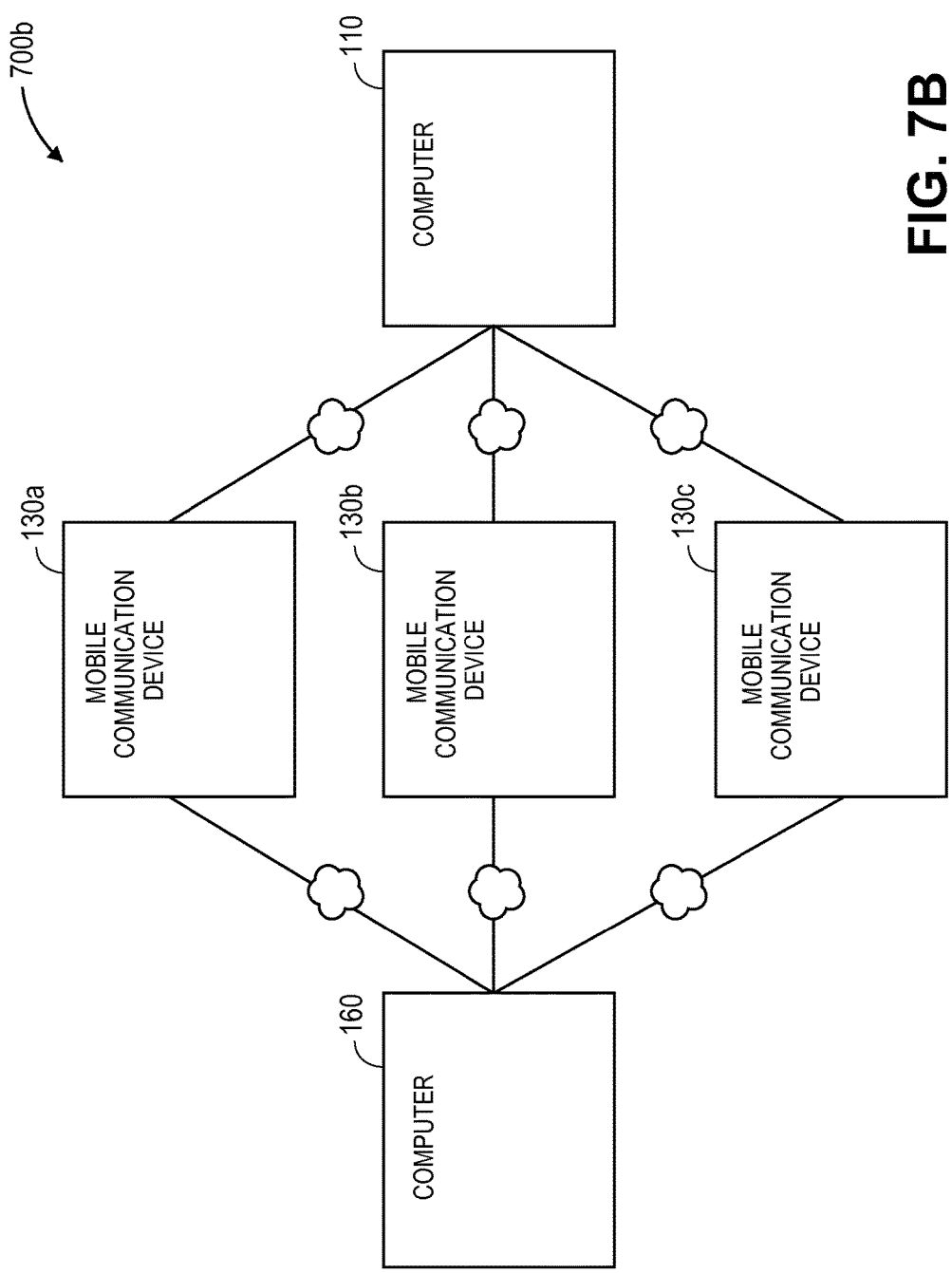
FIG. 7B is a block diagram of another embodiment of a system configured for requesting and/or transmitting document signatures involving multiple signors in which an application for entering a signature is downloaded from an intermediate computer that is in communication with mobile communication devices of respective signors.
Figure 8:
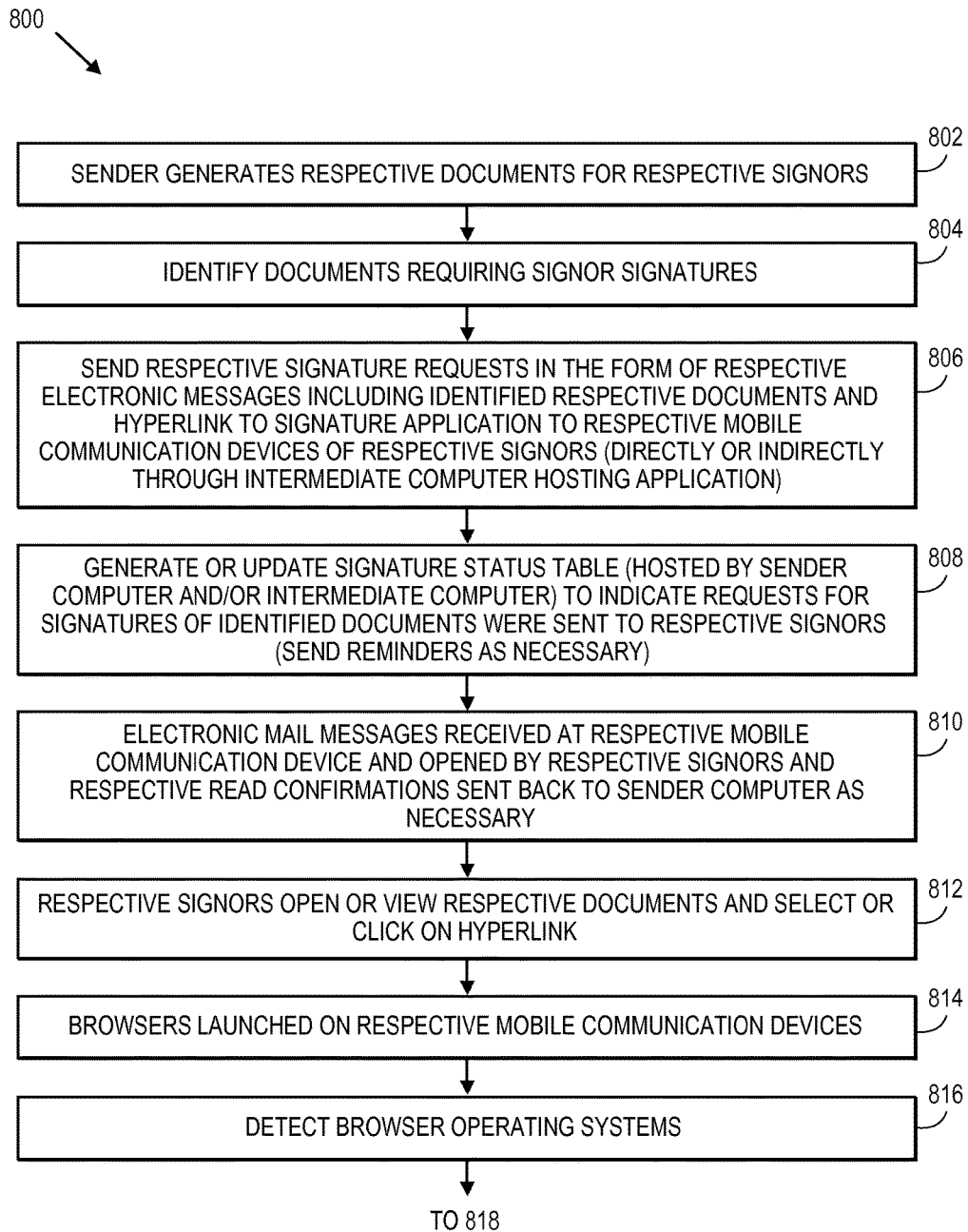
FIG. 8 is a flow diagram of one embodiment of a method for requesting and/or transmitting document signatures from multiple clients and updating a signature status table maintained by a sender of the document.
Figure 8:
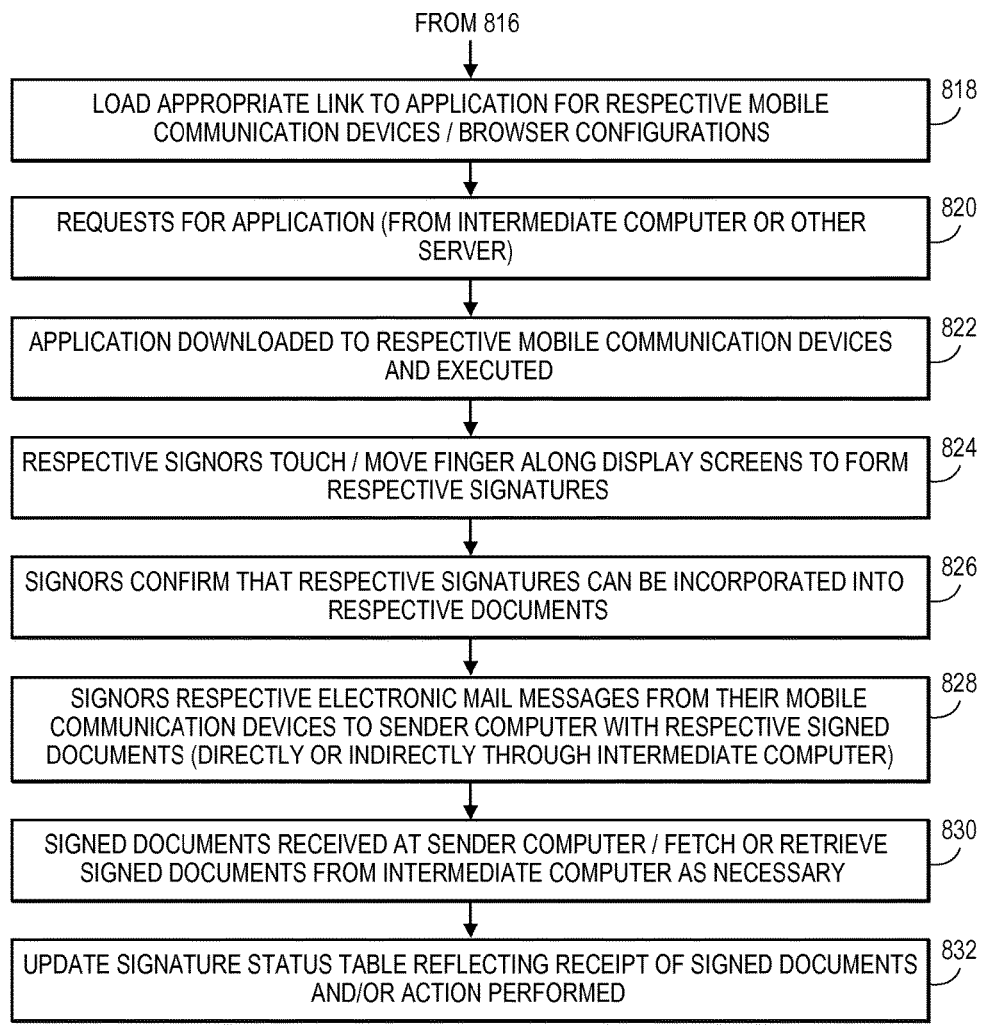

Referring to FIGS. 7A-B and 8, other systems 700*a* ad 700*b* and a method 800 for requesting, transmitting receiving and/or fetching respective signature pages or executed documents 112 involves multiple signors 135*a-c* for whom a sender 115 has generated respective documents 112*a-c* needing signatures. Descriptions of components of system 700*a*, 700*b* embodiments shown in FIGS. 7A-B that are the same as or similar to system components described above with reference to FIGS. 1A-B are not repeated and common reference numbers are utilized.

In the embodiment illustrated in FIG. 7A, the sender computer 110 is in communication with the intermediate computer 150, which may host the application 151 and/or electronic signature program 121 as discussed above, and is in communication with respective mobile communication devices 130*a-c* of respective signors 135*a-c*. In the embodiment illustrated in FIG. 7B, the sender computer 110 is in communication with respective mobile communication devices 130*a-c*, which are in communication with computer or server 160 hosting the application 151 that is downloaded to and execute on each of the mobile communication devices 130*a-c*. Signors 135*a-c* may have to sign only one document 112, multiple documents 112, or certain signors 135 may have to sign one document 112 whereas others may have to sign multiple documents 112. Accordingly, the configurations of systems 700*a* and 700*b* shown in FIGS. 7A-B are intended to generally illustrate that respective documents 112 are to be signed by respective signors 135*a-c*. Steps 802-832 in FIG. 8 are similar to steps 202-232 as described above with reference to FIG. 2, except method 800 involves multiple signors 135 rather than a single signor 135.

Figure 10:
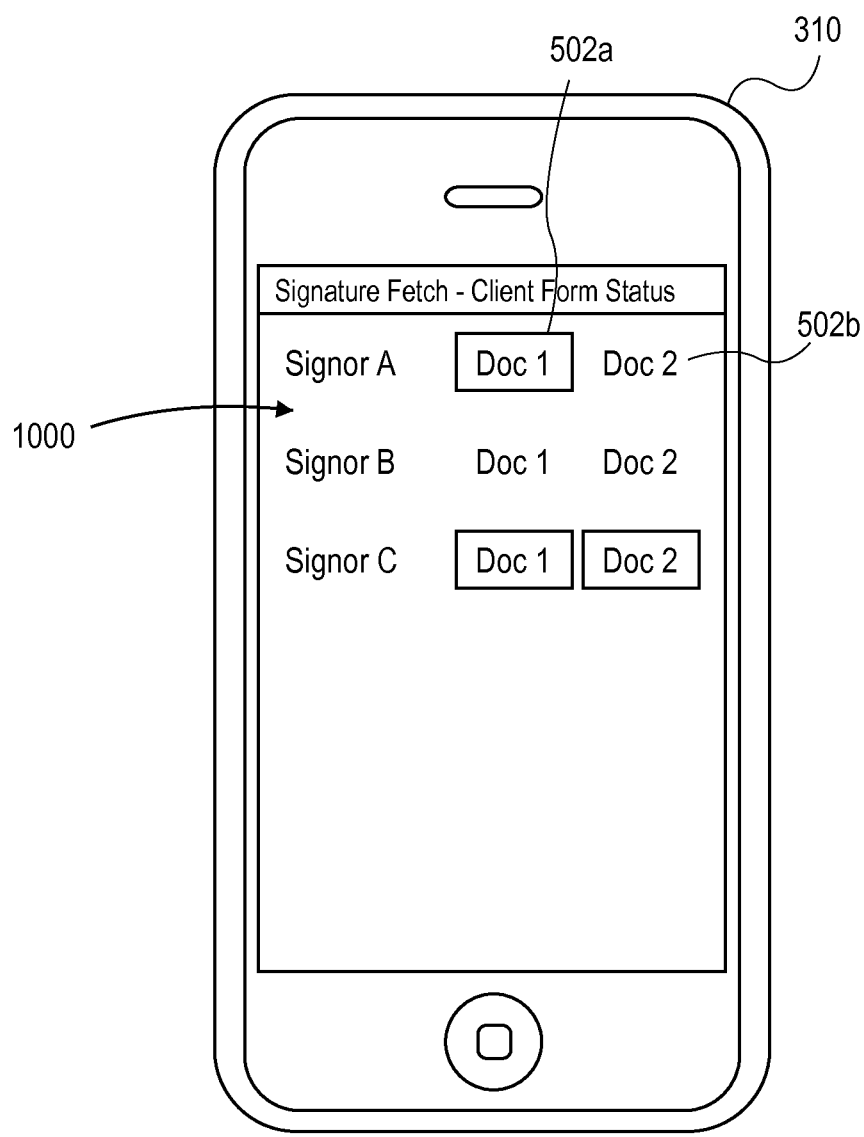
FIG. 10 illustrates an interface generated according to one embodiment based on data of the signature status table shown in FIG. 9, and that may be displayed on a mobile communication device or computer of a sender to indicate which documents of which signors have been signed and/or returned to the sender.

Referring to FIGS. 9-10, the status table 124, which may be generated, maintained or updated and hosted by the sender computer 110 or the intermediate computer 150, may include columns 902*a-e* identifying various signors 135, a document 112, whether the document 112 requires a signature, whether the sender 115 sent an electronic message 123*a* requesting the signature, and whether the signed document 112 was received by the sender 115. Referring to FIG. 10, data of the status table 124 may be complied or transformed into an interface 1000 that is displayed on a screen of the sender computer 110 (which may be smartphone or other mobile communication device as shown in FIG. 10 and as described above) to identify multiple signors 135, e.g., signors 135*a-c*, and include elements 520*a-c* representing or identifying documents 112 for which signatures have been received and that still need to be signed, as described above with reference to FIGS. 5-6E. In the illustrated embodiment, each of three signors 135*a-c* needs to sign the same two documents 112. The first signor 135*a* has signed one of the two documents 112 as indicated by the different background color or other indicator for elements 502*a*, a second signor 135*b* has not signed any document 112, and the third signor 135*c* signed both documents 112.

Figure 11A:
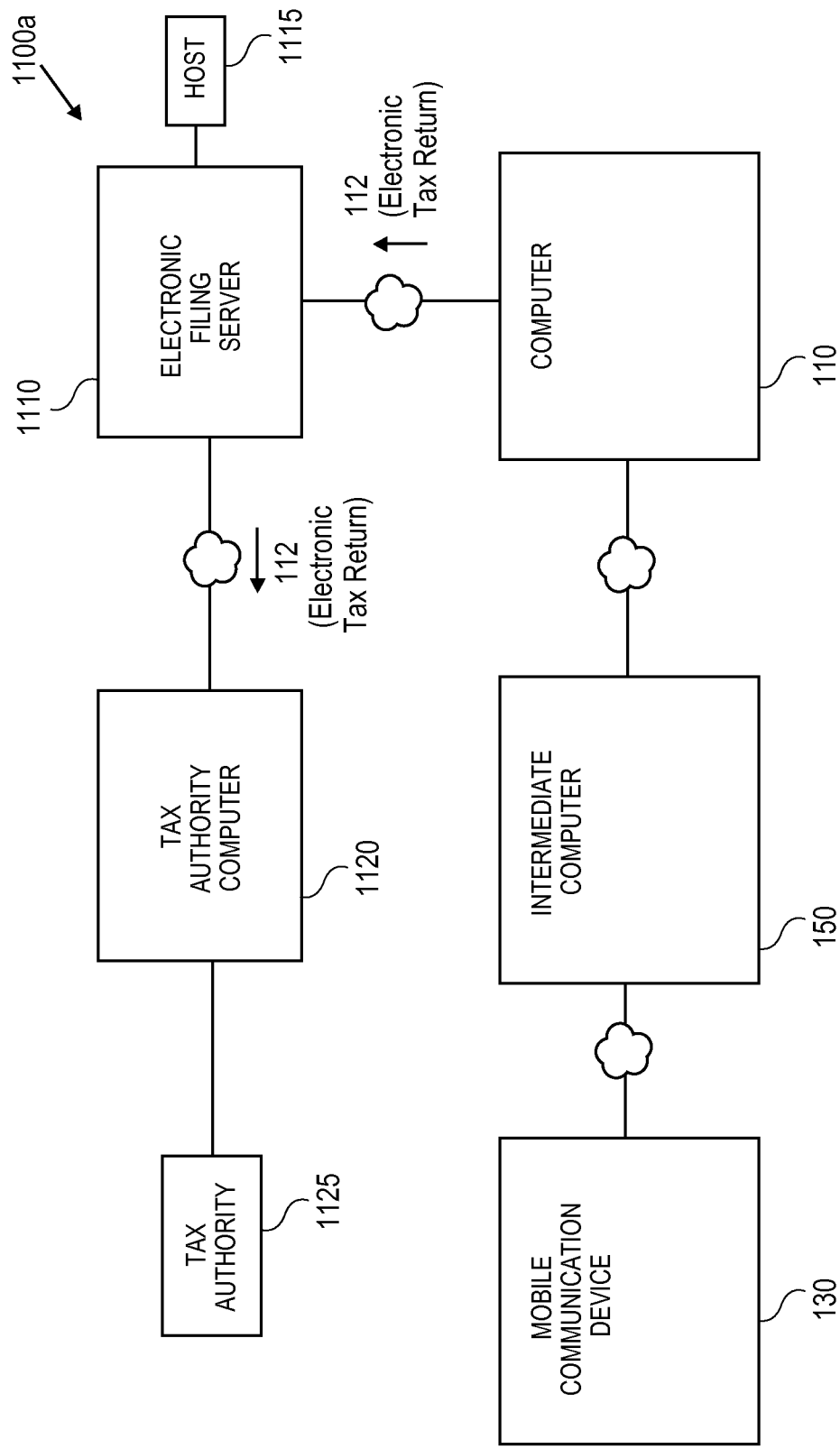
FIG. 11A is a block diagram of one embodiment of a system for requesting and/or transmitting an electronic tax return to be signed by a signor and filed with a tax authority.
Figure 11B:
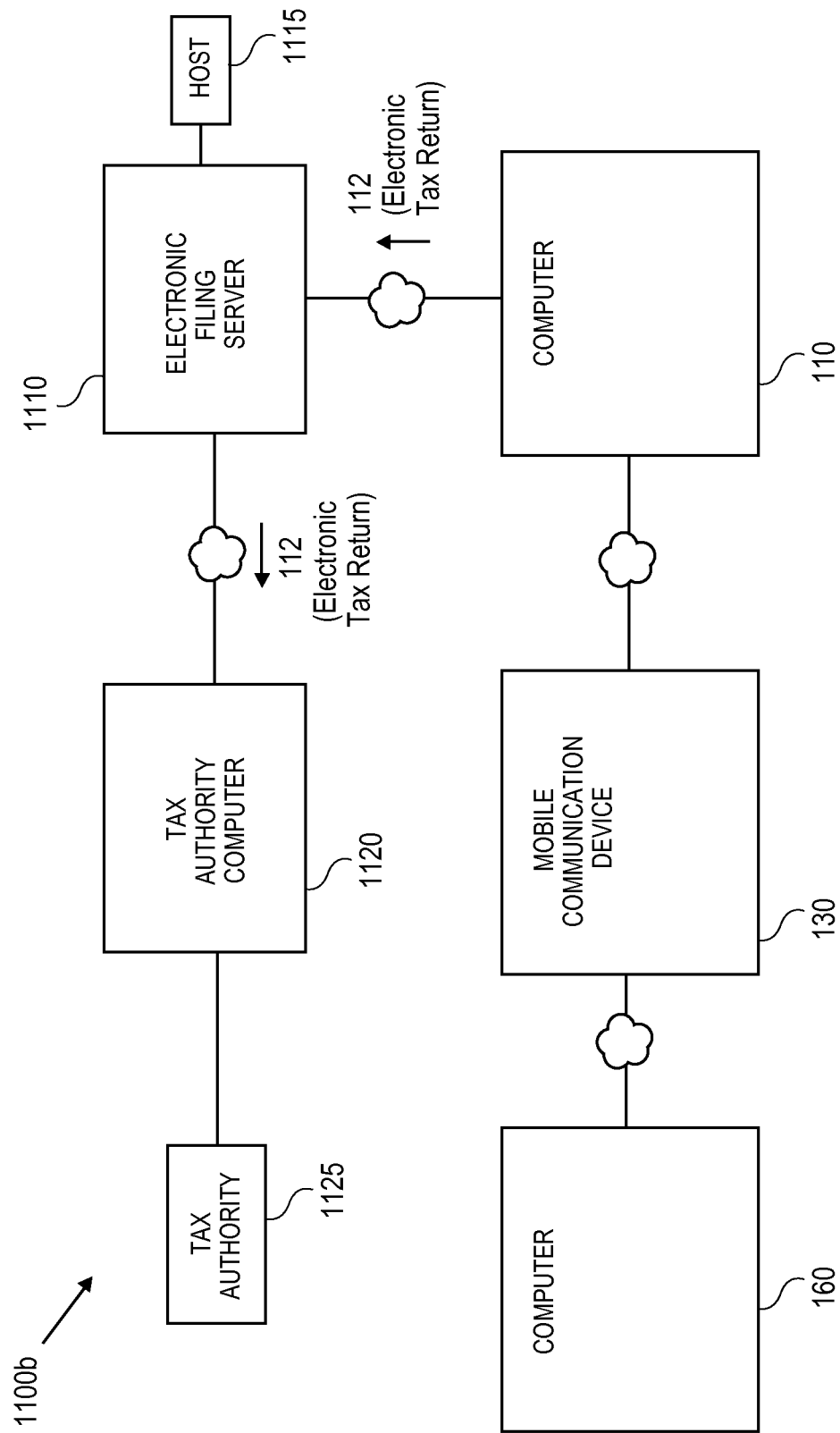
FIG. 11B is a block diagram of another embodiment of a system for requesting and/or transmitting an electronic tax return to be signed by a signor and filed with a tax authority.
Figure 12:
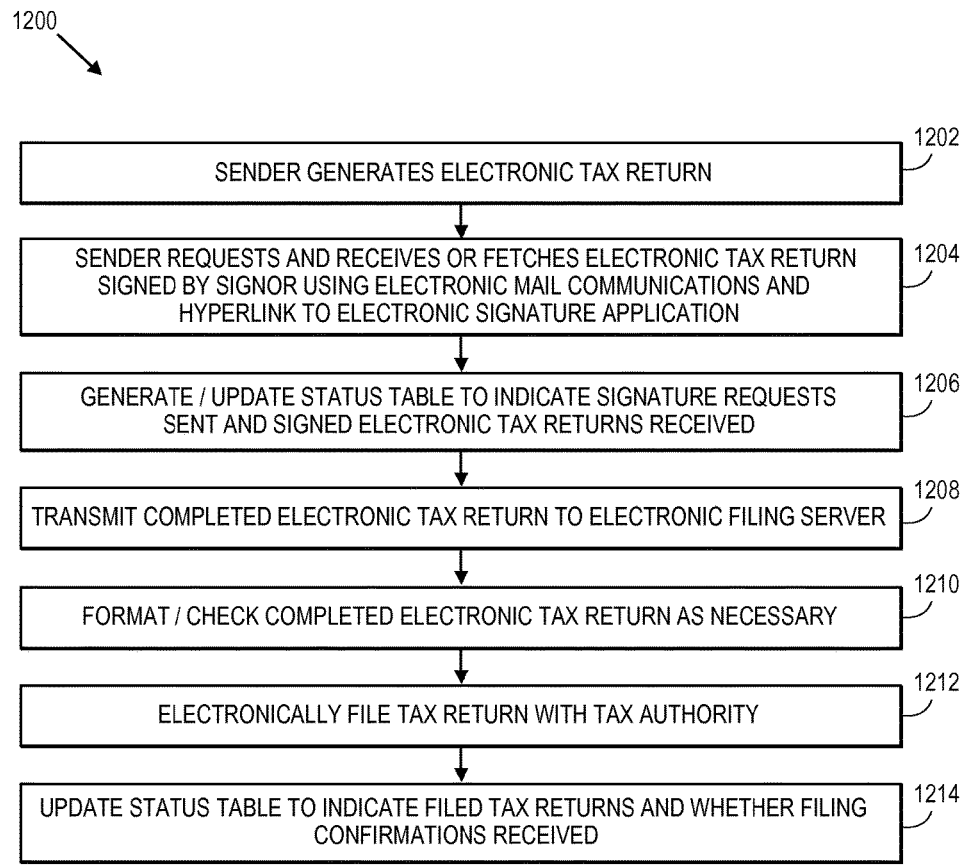
FIG. 12 is a flow diagram of one embodiment of a method for requesting and/or transmitting a signed electronic tax return to be filed with a tax authority.

FIGS. 11A-B and 12 illustrate one example of how embodiments may be implemented in the context of a sender 115 who is an accountant or tax professional that generates and forwards or sends a document 112 in the form of an electronic tax return to a signor 135 who is a client or taxpayer for signature. System components and aspects thereof are described above, and the elements in FIGS. 11A-B that were described above with reference to other figures are referred to by common reference numerals. Accordingly, descriptions of system components shown in FIG. 11 that are the same as or similar to system components described above with re are not repeated.

Referring to FIGS. 11A-B, the sender computer 110 is in communication with an electronic filing server 1110, e.g., a server of a host 1115 such as Intuit Inc. (which may also be host 155 as shown in FIGS. 1A-B). The electronic filing server 1110 is in communication with a computer 1120 of a tax authority 1125 such as the Internal Revenue service, a state tax authority, or other tax collecting entity.

Referring to FIG. 12, a method 1200 for requesting, transmitting receiving and/or fetching a signature page or executed document 112 comprises, at step 1202, the sender 115, who in this embodiment, is an accountant or tax professional, generating a document 112 in the form of a tax return, and at step 1204, the sender 115 sending an electronic message 123*a* requesting that the signor 135 sign the electronic tax return, and receiving an electronic message 123*b* in response that includes the signed tax return or fetching the signed tax return. The tax return is signed by signor 135 using the application 151 downloaded to the mobile communication device 130 in following clicking or selection of the hyperlink 314. The status table 124 is updated by the electronic signature program 121 to indicate whether the sender's requests were sent and whether signors 135 responded with signed tax returns. At step 1208, after receiving the signed electronic tax return, the completed and signed electronic tax return is transmitted to the electronic filing server 1110. At 1210, the electronic tax return is checked and formatted as necessary, and at 1212, electronically filed with the tax authority computer 1120. At step 1214, the electronic signature program 121 may update the status table 124 to indicate that the electronic tax return was signed and filed, and to indicate whether filing confirmations are received.

Figure 13:
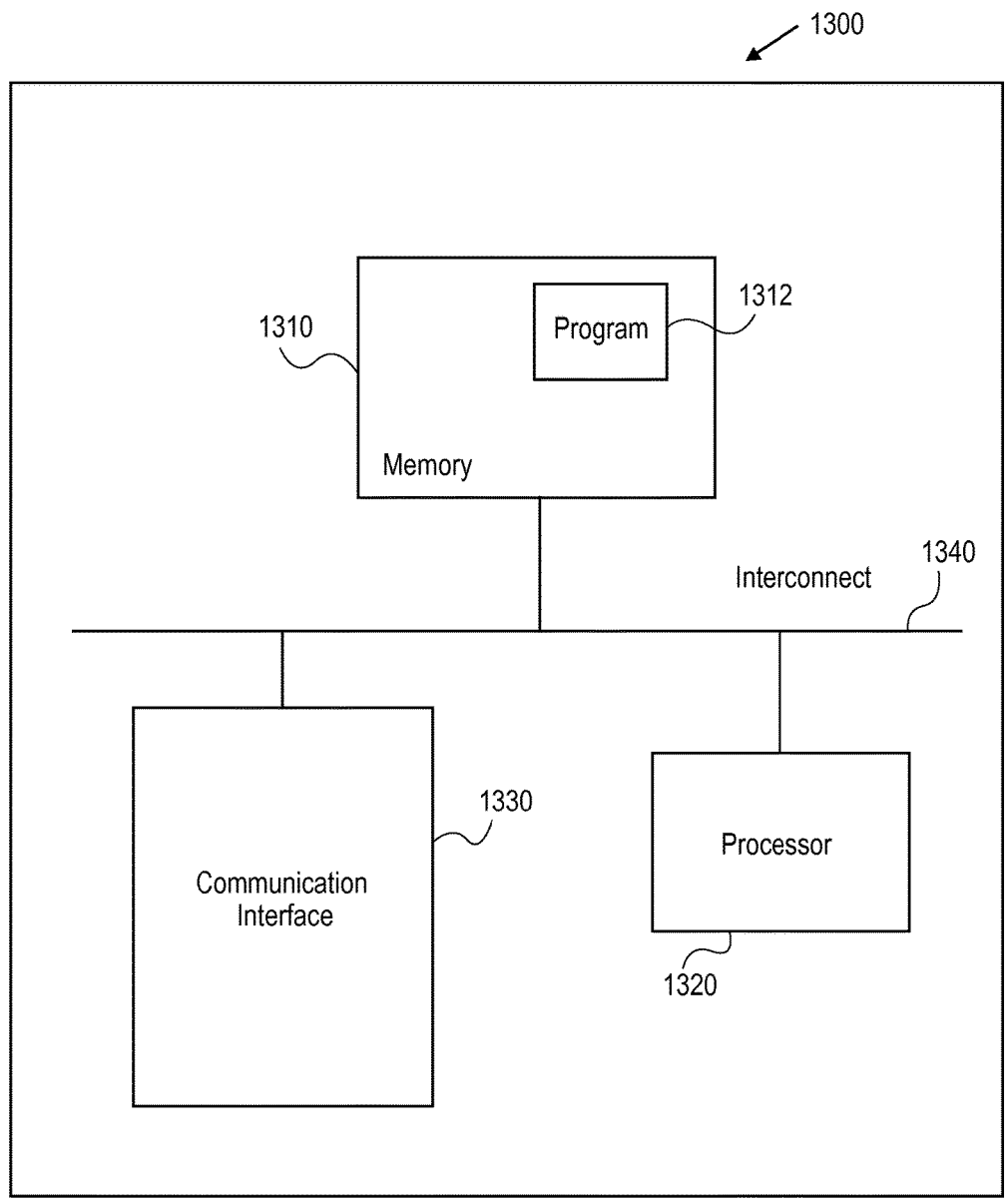
FIG. 13 is a block diagram of a computing apparatus or system in which various embodiments may be implemented or that may be utilized to execute various embodiments.

FIG. 13 generally illustrates certain components of a computing device 1300 that may be utilized to execute embodiments and that includes a memory 1310, program instructions 1312, a processor or controller 1320 to execute instructions 1312, a network or communications interface 1330, e.g., for communications with a network or interconnect 1340 between such components. The memory 1310 may be or include one or more of cache, RAM, ROM, SRAM, DRAM, RDRAM, EEPROM and other types of volatile or non-volatile memory capable of storing data. The processor unit 1320 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1340 may include a system bus, LDT, PCI, ISA, or other types of buses, and the communications or network interface may, for example, be an Ethernet interface, a Frame Relay interface, or other interface. The network interface 1330 may be configured to enable a system component to communicate with other system components across a network which may be a wireless or various other networks. It should be noted that one or more components of computing device 1300 may be located remotely and accessed via a network. Accordingly, the system configuration provided in FIG. 13 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1320 performs steps or executes program instructions 1312 within memory 1310 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

While certain embodiments are described with reference to an electronic document in the form of an electronic tax return, it should be understood that embodiments may be utilized with various other electronic documents and that electronic signatures may be integrated into various types of documents.

Further, communications between the preparer computer and the mobile communication device, between the preparer computer and the intermediate computer, and between the intermediate computer and the mobile communication device may be implemented using known communication protocols and networks such as cellular, wireless and Internet communications. Embodiments may involve a single preparer and single client, a single preparer and multiple clients, and various preparer who work with their respective clients.

While multiple embodiments and variations of aspects of the invention have been disclosed herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, particularly in instances in which certain steps may or may not be performed. Accordingly, embodiments are intended to exemplify alternatives, modifications, and equivalents that may fall within the scope of the claims.

What is claimed is:

1. A computer-implemented method for requesting and acquiring a signature of a first taxpayer for a first electronic tax return and a signature of a second taxpayer for a second electronic tax return, the method comprising:

a computing device of a preparer of the electronic tax returns, utilized to prepare the first electronic tax return for the first taxpayer and the second electronic tax return for the second taxpayer with a tax preparation application and in communication through a first network with a first mobile communication device of the first taxpayer, in communication through a second network with a second mobile communication device of the second taxpayer and in communication through a third network with an electronic filing server, the preparer's computing device transmitting a first electronic message to the first mobile communication device of the first taxpayer requesting the first taxpayer to sign the first electronic tax return, the first electronic message comprising:

the first electronic tax return attached to the first electronic message, and a first hyperlink within the first electronic message;

transmitting, from the computing device of the preparer, a second electronic message to the second mobile communication device of the second taxpayer requesting the second taxpayer to sign the second electronic tax return, the second electronic message comprising:

the second electronic tax return attached to the second electronic message, and a second hyperlink within the second electronic message, wherein the first hyperlink is selected or clicked by the first taxpayer to download the application to the first mobile communication device, the second hyperlink is selected or clicked by the second taxpayer to download the application to the second mobile communication device, the application being executed by the first and second mobile communication devices, wherein the application displays a first signature field on a first screen of the first mobile communication device, the first signature field capturing a first signature by the first taxpayer contacting the first screen, the first signature being incorporated into the first electronic tax return, and the application displays a second signature field on a second screen of the second mobile communication device, the second signature filed capturing a second signature by the second taxpayer contacting the second screen, the second signature being incorporated into the second electronic tax return;

the preparer's computing device receiving a third electronic message from the first mobile communication device of the first taxpayer at the preparer's computer in response to the first electronic message, the third electronic message comprising the first electronic tax return incorporating the signature of the first taxpayer;

the preparer's computing device receiving a fourth electronic message from the second mobile communication device of the second taxpayer at the preparer's computer in response to the second electronic message, the fourth electronic message comprising the second electronic tax return incorporating the signature of the second taxpayer;

the preparer's computing device transmitting a fifth electronic message including the first electronic tax return incorporating the signature of the first taxpayer to the electronic filing server in communication with a computer of a tax authority for electronic filing of the first electronic tax return incorporating the signature of the first taxpayer with the tax authority;

the preparer's computing device updating a status table indicating the first electronic tax return incorporating the signature of the first taxpayer was transmitted to the electronic filing server;

the preparer's computing device transmitting a sixth electronic message including the second electronic tax return incorporating the signature of the second taxpayer to the electronic filing server; and the preparer's computing device updating the status table indicating the second electronic tax return incorporating the signature of the taxpayer was transmitted to the electronic filing server.

2. The method of claim 1, the preparer's computing device and the first mobile communication device of the first taxpayer being at the same location at a first time, and the preparer's computing device and the second mobile communication device of the second taxpayer being at the same location at a second time.

3. The method of claim 1, the preparer's computing device being at a first location, the first mobile communication device of the first taxpayer being at a second location that is remote relative to the first location, and the second mobile communication device of the second taxpayer being at a third location that is remote relative to the first location and the second location.

4. The method of claim 1, wherein the first and second electronic messages are sent from the preparer's computing device to the first and second mobile communication devices, respectively, through an intermediate computer hosting the application, and the third and fourth electronic messages are sent from the first and second mobile communication devices, respectively, to the preparer computing device through the intermediate computer.

5. The method of claim 1, the electronic filing server hosting the tax preparation application.

6. The method of claim 1, further comprising the preparer's computing device:
receiving a confirmation from the electronic filing server that the first electronic tax return incorporating the signature of the first taxpayer was filed with the tax authority; and
updating the status table to indicate receipt of the confirmation.

7. The method of claim 1, the first electronic message transmitted by the preparer's computing device containing the first hyperlink to the downloadable application being a text message.

8. The method of claim 4, wherein the intermediate computer and the electronic filing server are managed by the same host.

9. A computer program product comprising a non-transitory computer readable storage medium having stored thereupon a sequence of instructions which, when executed by a computing device of a preparer utilized to prepare a first electronic tax return for a first taxpayer and a second electronic tax return for a second taxpayer with a tax preparation application and that is in communication through a first network with a first mobile communication device of the first taxpayer, in communication through second network with a second mobile communication device of the second taxpayer and in communication through a third network with an electronic filing server, causes the preparer's computing device to:
transmit a first electronic message requesting the first taxpayer to sign the first electronic tax return, the first electronic message comprising:
the first electronic tax return attached to the first electronic message, and
a first hyperlink to a downloadable application within the first electronic message; transmit a second electronic message requesting the second taxpayer to sign the second electronic tax return, the second electronic message comprising:
the second electronic tax return attached to the second electronic message, and
a hyperlink to the downloadable application within the second electronic message to the second mobile communication device of the second taxpayer and being transmitted by the preparer's computing device, wherein the first hyperlink is selected or clicked by the first taxpayer to download the application to the first mobile communication device, the second hyperlink is selected or clicked by the second taxpayer to download the application to the second mobile communication device, the application being executed by the first and second mobile communication devices, wherein the application displays a first signature field on a first screen of the first mobile communication device, the first signature field capturing a first signature by the first taxpayer contacting the first screen, the first signature being incorporated into the first electronic tax return, and the application displays a second signature field on a second screen of the second mobile communication device, the second signature filed capturing a second signature by the second taxpayer contacting the second screen, the second signature being incorporated into the second electronic tax return;
receive a third electronic message from the first mobile communication device of the first taxpayer at the preparer's computing device in response to the first electronic message, the third electronic message comprising the first electronic tax return incorporating the signature of the first taxpayer;
receive a fourth electronic message from the second mobile communication device of the second taxpayer at the preparer's computing device in response to the second electronic message, the fourth electronic message comprising the electronic tax return incorporating the signature of the second taxpayer;
transmit a fifth electronic message including the first electronic tax return incorporating the signature of the first taxpayer to the electronic filing server in communication with a computer of a tax authority for electronic filing of the first electronic tax return incorporating the signature of the first taxpayer with the tax authority;

update a status table indicating the first electronic tax return incorporating the signature of the first taxpayer was transmitted to the electronic filing server;
transmit a sixth electronic message including the second electronic tax return incorporating the signature of the second taxpayer to the electronic filing server; and
update the status table indicating the second electronic tax return incorporating the signature of the second taxpayer was transmitted to the electronic filing server.

\* \* \* \* \*